(No Model.)

M. D. SMALLEY.
FRICTION CLUTCH.

No. 515,450.   Patented Feb. 27, 1894.

ATTEST:
Geo. H. Arthur
M. H. Holmes

INVENTOR:
Martin D. Smalley
by Robert Burns
Att'y.

UNITED STATES PATENT OFFICE.

MARTIN D. SMALLEY, OF PLYMOUTH, INDIANA.

FRICTION-CLUTCH.

SPECIFICATION forming part of Letters Patent No. 515,450, dated February 27, 1894.

Application filed December 12, 1892. Serial No. 454,939. (No model.)

*To all whom it may concern:*

Be it known that I, MARTIN D. SMALLEY, a citizen of the United States, residing at Plymouth, in the county of Marshall and State of Indiana, have invented certain new and useful Improvements in Friction-Clutches; and I do hereby declare the following to be a full, clear, and exact description of the same, reference being had to the accompanying drawings, forming part of this specification.

This invention relates to that type of friction clutches in which a series of segmental friction drivers move radially to engage against the inner periphery of the pulley rim.

The object of the present improvement is to provide a simple and durable form of such clutch mechanism in which provision is made for a ready adjustment of parts to compensate for wear. I attain such object by the construction and arrangement of parts illustrated in the accompanying drawings in which—

Figure 1:
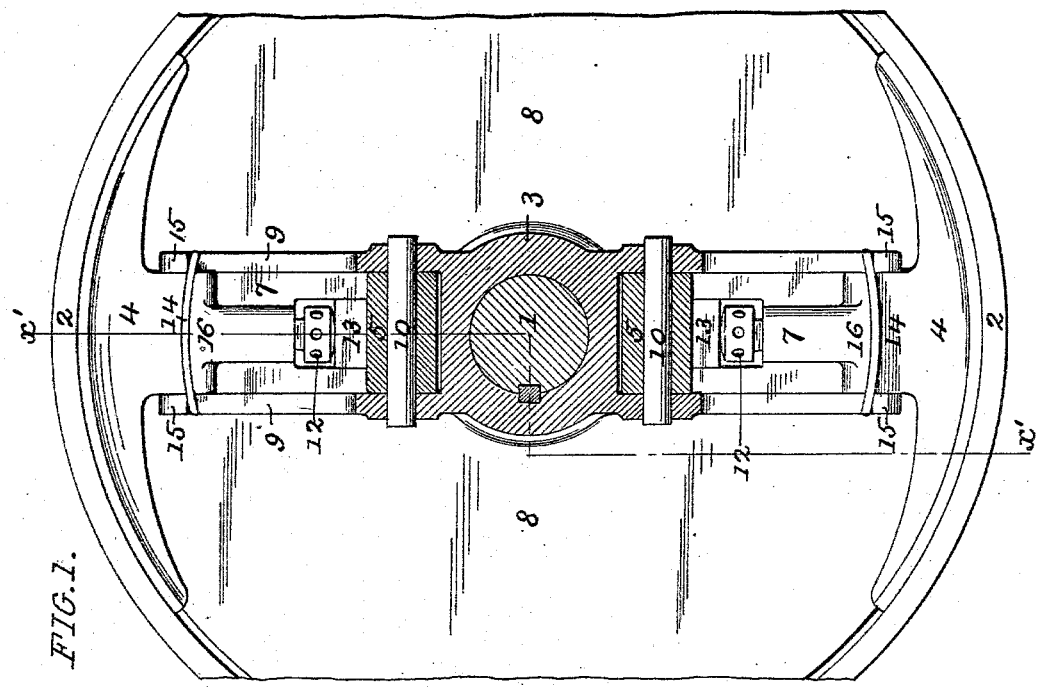
Figure 2:
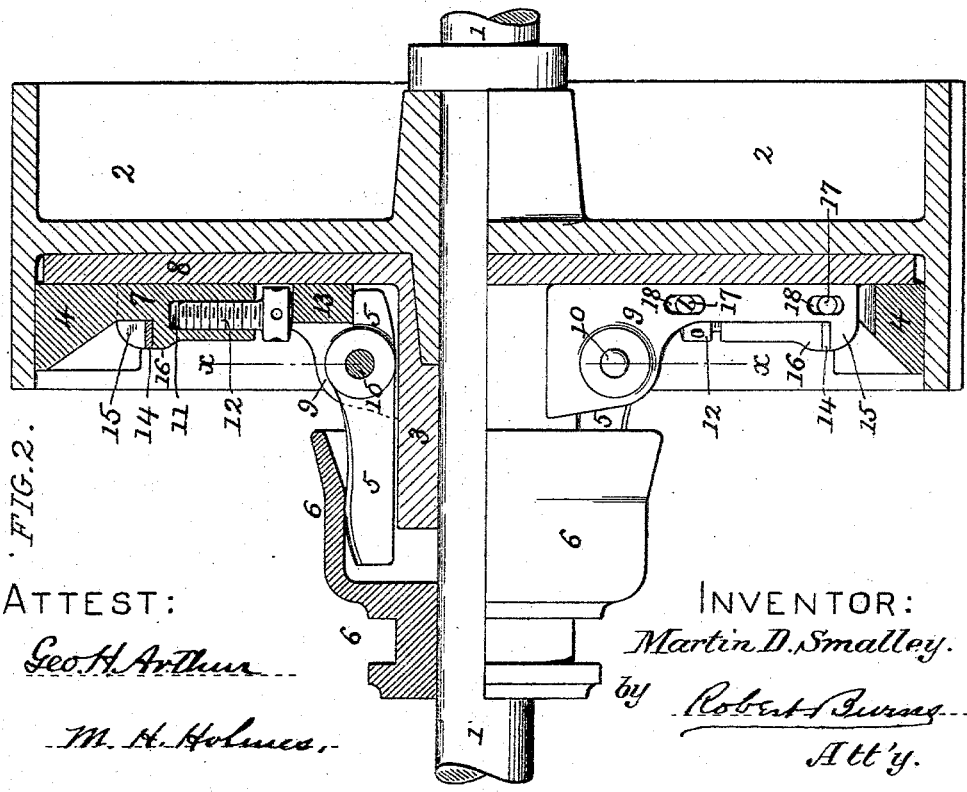

Figure 1, is a transverse sectional elevation at line $x$—$x$, Fig. 2; and, Fig. 2, a longitudinal sectional elevation at line $x'$—$x'$, Fig. 1.

Similar numerals of reference indicate like parts in both views.

Referring to the drawings, 1, represents the carrying shaft; 2 the driven pulley mounted loosely on the shaft; 3 the hub of the web 8 keyed or otherwise fixedly secured to the shaft 1, and which carries the radially moving segmental friction drivers 4 and their operating levers 5; and 6 a sleeve sliding on a spline on the shaft 1, and having a conically recessed end that engages the outer ends of the levers of the friction drivers to impart an outward clutching movement to such drivers.

In the present invention, the shanks 7 of the friction drivers 4, are housed and slide in radial recesses formed at one side of web 8 by projecting parallel ribs 9 on the same, which ribs are continued longitudinally along the hub portion to form bearings for the fulcrum pins 10 of the levers 5. The inner end of each of the shanks 7, is formed with a screw-threaded orifice 11, for the reception of the screw-threaded shank of the radially arranged adjusting bolt 12, the head of which bears against one end of the intermediate sliding block 13, the other end of which has bearing in turn upon the inner arm or toe of the lever 5, so that an outward movement of such toe of the lever, through the coned recess of the sliding sleeve 6, will impart an outward movement to the segmental friction drivers, to cause the same to bind against the inner periphery of the rim of the loose pulley 2 to drive or revolve the same. In the construction shown the intermediate block 13, is guided in a suitable central recess in the shank 7; and the head of the adjusting bolt 12, is of the ordinary round capstan form for convenience of operation.

As shown in the drawings, the head of the adjusting screw 12, and the toe of the lever 5, in contact with the opposite ends of the intermediate block 13, are rounded, the construction being such that sliding motion between the parts is transferred from the head of the screw to the opposite face of the block 13, and a sliding movement directly on the head of the screw avoided. A sliding movement of the lever 5 directly on the screw would have a tendency to twist the screw in its socket, so as to make it bind or produce a wearing effect upon its threads.

By the use of different lengths of intermediate blocks 13, the other clutch parts can be used on different diameters of pulleys without any material change in such other clutch parts.

The friction drivers are forced inward to release the driven pulley 2, by means of a flat spring 14, the outer ends of which bear against lateral lugs 15 on the ribs 9 of the web 8, its central portion bearing against a lateral lug 16, on the shank 7, of each of the friction drivers 4; with this construction the tendency of the spring is to straighten, and in doing so, to force the friction drivers inwardly.

The shanks of the friction drivers are held in proper position between their housing ribs 9 by any suitable appliance; in the drawings I show guide studs 17 on the shank moving in elongated slots 18 in the ribs for such purpose.

Having thus fully described my said invention, what I claim as new, and desire to secure by Letters Patent, is—

1. A friction clutch comprising in combination, a series of radially moving segmental friction drivers 4, each having a screw-threaded shank 7, the headed adjusting bolts 12, the intermediate blocks 13, the levers 5, and the web 8, forming a bearing and guide for the parts, the heads of adjusting bolts and the toes of the levers in contact with the opposite ends of the block 13, made rounded, substantially as set forth.

2. A friction clutch comprising in combination, a series of radially moving segmental friction drivers 4 each having a screw-threaded shank 7, the adjusting bolts 12 having rounded heads, the intermediate blocks 13, the levers 5 having rounded toes, the springs 14, and the ribs 9 having lateral lugs 15, substantially as set forth.

In testimony whereof witness my hand this 28th day of November, 1892.

MARTIN D. SMALLEY.

In presence of—
UPTON C. SCHILT,
LEONARD VOGELI.